(No Model.) 2 Sheets—Sheet 1.

T. & W. H. COLDWELL.
LAWN MOWER.

No. 475,669. Patented May 24, 1892.

Witnesses:

Inventors
Thomas Coldwell
William H. Coldwell
by J. S. Barker his Atty (No Model.) 2 Sheets—Sheet 2.
T. & W. H. COLDWELL.
LAWN MOWER.
No. 475,669. Patented May 24, 1892.
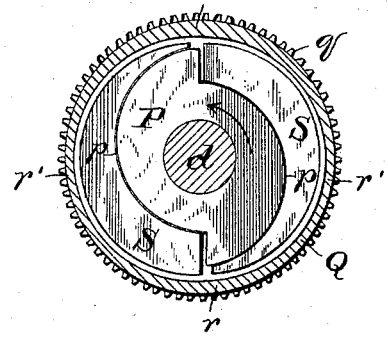
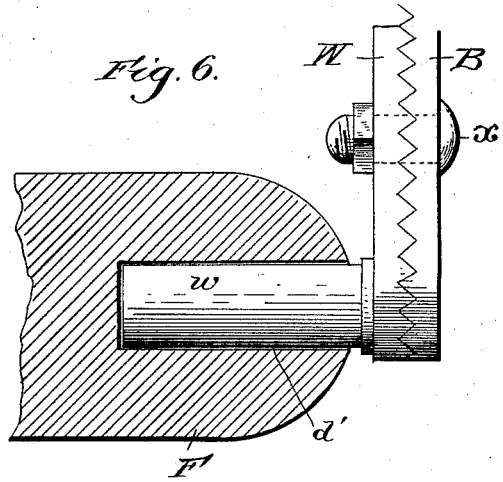
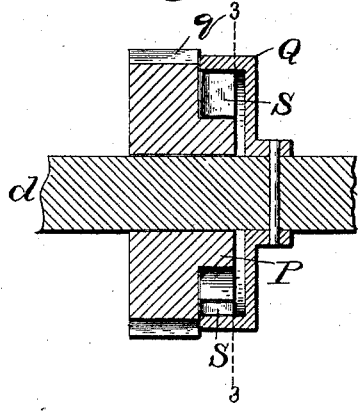
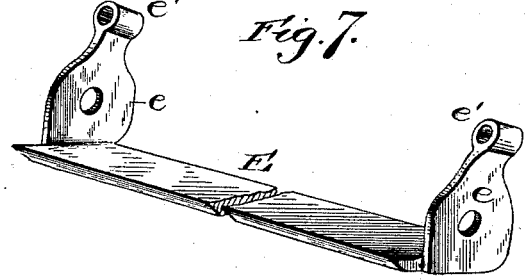
Witnesses:
Inventors.
Thomas Coldwell and
William H. Coldwell
by J. J. Barker
their atty.

UNITED STATES PATENT OFFICE.

THOMAS COLDWELL AND WILLIAM H. COLDWELL, OF NEWBURG, NEW YORK.

LAWN-MOWER.

SPECIFICATION forming part of Letters Patent No. 475,669, dated May 24, 1892.

Application filed September 15, 1891. Serial No. 405,802. (No model.)

*To all whom it may concern:*

Be it known that we, THOMAS COLDWELL and WILLIAM H. COLDWELL, citizens of the United States, residing at Newburg, in the county of Orange and State of New York, have invented certain new and useful Improvements in Lawn-Mowers, of which the following is a specification.

Our invention relates to improvements in lawn-mowers, having for its object the improvement of this class of machines in the particulars to be hereinafter pointed out; and it consists in improvements in the manner of adjusting the bed or stationary knife, in improvements in mounting the adjustable revolving knife or cutter, in improvements in the clutch which connects the revolving cutter-shaft with the driving-gearing, and in improvements in the connections or supports for the handle.

Figure 1:
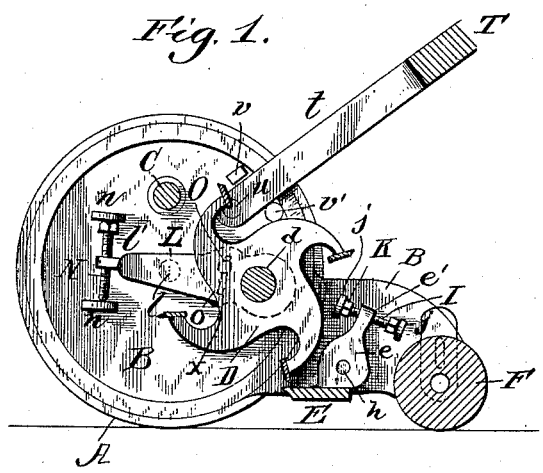
Figure 2:
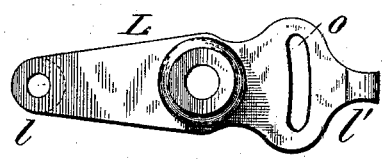
Figure 9:
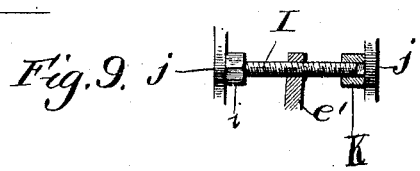
Figure 5:
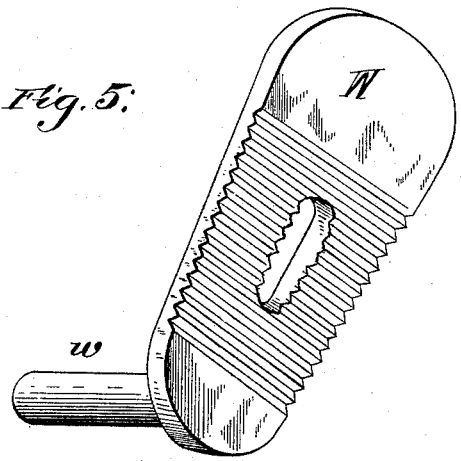
Figure 4:
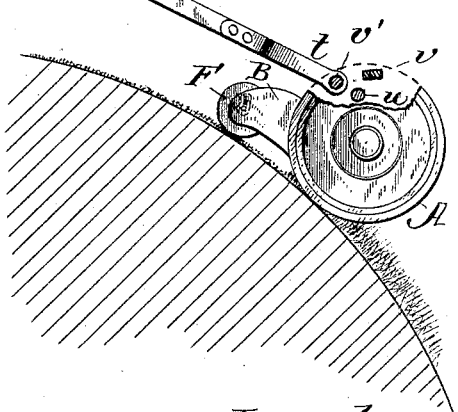

In the drawings, Figure 1 is a vertical section of a lawn-mower containing our improvements. Fig. 2 is a detail view showing a different style of supporting-arm for the revolving cutter from that shown in Fig. 1. Fig. 3 is a sectional view of the clutch on the line 3 3 of Fig. 8. Fig. 4 is a view illustrating the loose attachment of the handle and the machine in the act of mowing a terrace. Fig. 5 is a detail view of the hanger or support for the rear roller. Fig. 6 is a longitudinal section of one end of the rear roller and its support. Fig. 7 is a perspective view of our single-piece bed-knife. Fig. 8 is a longitudinal section of the clutch. Fig. 9 is a sectional view of the adjusting devices for the bed-knife.

We have illustrated our improvements as applied to a rear-cut lawn-mower; but it is evident that each feature thereof is applicable to machines of different kinds.

In the drawings, A represents the main driving or ground wheels, to which are secured the side frames B.

C represents the cross-bar; D, the revolving knife or cutter; E, the stationary or bed knife, and F the small rear ground-roller. We propose to make the stationary or bed knife and the end plates or pieces, by which it is secured to the end frames, of a single piece of cast iron or steel, such a knife being illustrated in detail in Fig. 7 of the drawings. The end pieces or plates $e$ of the bed-knife are perforated and they are secured to the side frames B by the bolts $h$, passing through the perforations, and upon which the knife can swing, so as to be adjusted toward or from the revolving cutter D. The plates $e$ are provided with the upward-extending arms $e'$, screw-threaded at their upper ends to receive the adjusting-screws I, which are situated between the lugs $j$ on the side frames B. It is now customary to have the adjusting-screws, which pass through the vertical pivoted side arms of the knife-support, fit tightly between the lugs on the side frames with their ends abutting against the lugs, whereby they are held in place. In practice it is found difficult to get the screws to always fit tightly between such lugs, they often being either slightly too long or too short, and hence this adjusting device works more or less unsatisfactorily. To overcome this defect, we propose to make the screws I extensible, so that their length can be varied to fit exactly between the lugs, though the distance between the lugs on two different machines may vary somewhat. We prefer to accomplish this result by making the screw I, which engages with the side arm of the knife-bar, shorter than the distance between the lugs $j$ and screwing onto its end a nut K, which can be turned so as to lock the screw tightly between the lugs, the nut engaging one lug and the end of the screw the other. This nut K serves a double purpose. It serves to make, in effect, the screw extensible, so that its length may be made to exactly fit between the lugs, and it serves, also, when turned tightly against its lug to lock the screw-rod, so that it cannot accidentally turn, and thereby vary the adjustment of the knife. The screws I are provided with heads $i$ in the usual manner to receive a wrench. In using this form of adjusting device the nut K is first turned onto the screw sufficiently far to loosen it between the lugs $j$. Then the screw I is turned to give the knife the proper adjustment, after which the nut is backed off until it bears snugly against the lug and the screw is locked in place. The revolving cutter D is also adjustable. Its shaft $d$ is mounted in two plates or bars L L, secured, respectively, to the side frames B of the machine. Each plate or bar L is hung upon a pivotal support $l$, secured to the side frame B and arranged in line with the axis of the wheel A, so that this cutter swings in a path concentric with the center of the driving-wheels, and whatever be the position to which the cutter D is adjusted its driving-pinion $q$, Figs. 3 and 8, is always in proper mesh with the internal gear on the wheel A. The plate L extends forward from its pivot $l$ and is there provided with an arm $l'$, which is threaded to receive the screw N, by which it is adjusted. The screw N is arranged between two lugs $n$ on the side frame, and its operation from the description of the adjustment of the bed-knife already described will be understood. The bar L is slotted at $o$, and a clamping-nut O passes through this slot and holds the bar in place after it has been adjusted. If preferred, the bar L may be of the shape shown in Fig. 2—that is, the portion $l'$, which receives the adjusting-screw N, may extend rearward beyond the bearings for the revolving cutter-shaft instead of forward beyond its pivotal support $l$. The pinion $q$, which engages with the internal gear of the rim of the ground-wheel, is loose upon the shaft $d$, and has secured to its face, preferably by being cast integral therewith, the double cam P, which constitutes a part of the clutch between the driving-wheel and the revolving cutter-shaft.

Q is a shell secured fast to the cutter-shaft $d$ close up to the face of the pinion $q$, to which the cam P is secured, so that the cam is situated within the shell, and S S are two tapering segmental pieces or blocks which are situated between the inner wall of the shell and the double cam. The inner wall of the flange or rim of the shell, against which the segments S lie, is eccentric to its axis, there being two diametrically-opposed portions $r$, which are nearer to its axis than are the two intermediate portions $r'$. When the pinion $q$ and the cam are turned by the forward movement of the ground-wheel in the direction of the arrow, Fig. 3, the segments are wedged between the rim or flange of the shell and the faces $p$ of the cam so tightly as to cause the shaft $d$ and the cutter carried thereby to be turned. When, however, a reverse movement of the wheels A takes place or when the mower is suddenly stopped, the clutch disengages, the segments being no longer forced out against the rim of the shell by the inclined or scroll faces $p$ of the cam, and the wheel $q$ and the cutter can then move independently of each other. The segments are of such a length that when their middle portions lie opposite the parts $r$ of the shell-rim their ends abut, or very nearly so. Of course when they are turned one-fourth around from this position their ends are separated somewhat, as shown in Fig. 3, as they are not held by the shell-wall quite so close up to the cam, and hence they do not lock or clutch. This form of clutch has a certain amount of slip, the position lock not taking place until the segments bind between the cam and the portions $r$ of the shell-rim. When a positive clutch is used on a mower, particularly where the revolving cutter is heavy, parts of the machine are often strained or broken in starting the machine suddenly. This danger is reduced by the use of the clutch just described, because the cutter is started gradually, a little slip taking place until the segments are gripped fast in the manner described, after which the clutch becomes practically positive in its action, which would not be the case in a lawn-mower if the inner face of the shell-rim Q were concentric with the shaft $d$.

T designates the handle, having the forked ends $t$, which are perforated and adapted to be sprung over the lugs $u$, carried by the side frames B. The handles are held at the proper inclined position for ordinary work by the lugs or projections $v$ $v'$, between which the arms $t$ of the handle lie. Instead of making both of these lugs $v$ and $v'$ with flat faces, as is customary, we make one of them, preferably the lower one $v'$, round and of a shape to correspond to the lug $u$, so that the arms of the handle may engage these lugs $v'$ as well as the lugs $u$. When engaging with the lugs $v'$, the handle is free to swing and the mower will follow the contour of the ground, with both the wheels A and the rear roller D in contact therewith, no matter how the handle be held. This is especially valuable in mowing terraces, as the mower will run over the edge and down the face of the terrace while the operator holds the handle in a natural and usual position, as illustrated in Fig. 4. Either or both of the lugs $v$ $v'$ may be round and adapted to receive the handle. It will be seen that the lug $u$ is arranged in front of and between the lugs $v$ and $v'$, so that when the handle is in engagement with the lugs $u$ it will lie between the lugs $v$ and $v'$; but when it engages with one of the rear lugs it is free to rock or turn.

We are aware that lawn-mowers have been provided with loose handles, but believe that we are the first to adapt the machine to receive either a loose or a fixed handle, as may be desired.

The small wooden rear ground-rollers of lawn-mowers as now made have metallic pins inserted into their ends, and these pins run in metal sockets in the roller-supports. The result is that much noise is produced by this way of mounting the rollers. We avoid this noise, and at the same time make a support for the rear roller which is otherwise preferable to that referred to. Into each end of the roller D we bore a hole $d'$, and into this extends a pin $w$, formed integral with the supporting-plates W, which are secured, preferably adjustably, as shown, to the side frames of the machine by the screw-bolts $x$. This does away with the running of two metallic parts upon each other and makes an easy-running noiseless construction.

It is evident that one or more of the novel features herein described might be used upon a machine without the others.

Without limiting ourselves to the precise construction and arrangement of parts shown, what we claim is—

1. The combination, with a knife or cutter pivotally supported, of an arm connected therewith, an extensible adjusting-screw engaging with such arm, and the lugs or abutments between which the said extensible screw is situated, substantially as described.

2. The combination, with a pivoted knife or cutter, of the adjusting means thereof, consisting of an arm connected with the cutter, an adjusting-screw engaging with the said arm, a lock-nut upon one end of the screw, and the lugs or abutments between which the screw is situated and against one of which the lock-nut can be made to bear, substantially as described.

3. In a lawn-mower, the combination, with the driving-wheels and the side frames, of the revolving cutter, the plates or bars in which the cutter is mounted, supported upon pivots arranged in line with the axis of the driving-wheels, the means for adjusting the position of the said plates or bars which support the revolving cutter, and the stationary knife or cutter carried by the side frame, substantially as described.

4. In a lawn-mower, the combination, with the driving-wheel and the revolving cutter, of the pinion which the driving-wheel operates, and the clutch situated between the pinion and the revolving cutter-shaft and consisting of the cam, the shell having the eccentric inner wall, and the tapering segment situated between the cam and the eccentric wall of the shell, substantially as described.

5. A lawn-mower the side frames of which are provided with lugs $u$, $v$, and $v'$, the lug $u$ being adapted to receive the handle and being situated in front of and between the other lugs which serve to steady the handle, one of the other lugs being also adapted to receive the handle which when held thereby is free to turn thereon, substantially as set forth.

In testimony whereof we affix our signatures in presence of two witnesses.

THOMAS COLDWELL.
WILLIAM H. COLDWELL.

Witnesses:
HOWARD THORNTON,
W. F. CASSEDY.